United States Patent [19]

Evans et al.

[11] Patent Number: 5,547,737
[45] Date of Patent: Aug. 20, 1996

[54] LIGHT-WEIGHT, HIGH-STRENGTH, STIFF PANELS

[75] Inventors: Maurice J. Evans, Sutton Coldfield; Sharon L. Faulkner, Coventry; Ronald Fisher, Rugby; Trevor C. Wells, Leamington Spa; Paul Hadlum, Coventry, all of England

[73] Assignee: Dunlop Limited, London, England

[21] Appl. No.: 303,671

[22] Filed: Sep. 9, 1994

Related U.S. Application Data

[62] Division of Ser. No. 190,615, Feb. 2, 1994, Pat. No. 5,360,500, which is a continuation of Ser. No. 74,985, Jun. 10, 1993, abandoned, which is a continuation of Ser. No. 888,403, May 21, 1992, abandoned, which is a continuation of Ser. No. 725,225, Jun. 26, 1991, abandoned, which is a continuation of Ser. No. 390,459, Aug. 4, 1989, abandoned, which is a continuation of Ser. No. 121,009, Nov. 20, 1987, abandoned.

[30] Foreign Application Priority Data

Nov. 20, 1986 [GB] United Kingdom .................. 8627819

[51] Int. Cl.$^6$ .................................................. B32B 3/12
[52] U.S. Cl. ......................... 428/178; 428/188; 428/280; 428/289; 52/793.1
[58] Field of Search ....................... 428/178, 188, 428/72, 120, 175, 192, 280, 287; 52/793.1

[56] References Cited

U.S. PATENT DOCUMENTS

| | | | |
|---|---|---|---|
| 2,789,038 | 4/1957 | Benett et al. | 23/209.1 |
| 3,367,812 | 2/1968 | Watts | 264/29.5 |
| 3,399,092 | 8/1968 | Adams et al. | 156/74 |
| 3,778,336 | 12/1973 | Adams et al. | 427/375 X |
| 3,914,395 | 10/1975 | Finelli et al. | 264/29.5 X |
| 3,991,248 | 11/1976 | Bauer | 427/249 X |
| 4,051,289 | 9/1977 | Adamson | 428/116 |
| 4,100,322 | 7/1978 | Seibold et al. | 264/29.5 X |
| 4,132,577 | 1/1979 | Wintermantel | 156/156 |
| 4,178,413 | 12/1979 | De Munda et al. | 427/228 |
| 4,223,053 | 9/1980 | Brogan | 428/116 X |
| 4,487,799 | 12/1984 | Galasso et al. | 427/249 X |
| 4,514,240 | 4/1985 | Heraud | 427/249 X |
| 4,522,883 | 6/1985 | Wallace et al. | 428/368 |
| 4,606,955 | 8/1986 | Eastman et al. | 428/36 |
| 4,617,072 | 10/1986 | Mertz | 156/89 |
| 4,659,624 | 4/1987 | Yeager et al. | 264/29.5 X |

FOREIGN PATENT DOCUMENTS

| | | |
|---|---|---|
| 0151213 | 7/1984 | European Pat. Off. . |
| 2368295 | 8/1977 | France . |
| 1234874 | 6/1968 | United Kingdom . |
| 1210205 | 10/1970 | United Kingdom . |
| 1409736 | 10/1975 | United Kingdom . |
| 1582758 | 10/1977 | United Kingdom . |
| 1524714 | 9/1978 | United Kingdom . |
| 1571978 | 7/1980 | United Kingdom . |
| 2084045 | 4/1982 | United Kingdom . |

OTHER PUBLICATIONS

Publication entitled "Carbon fibers" authored by W. T. Gunston dated Feb. 1969 from *Science Journal*.

*Primary Examiner*—Donald J. Loney
*Attorney, Agent, or Firm*—Lorusso & Loud

[57] ABSTRACT

A method for the manufacture of a light-weight panel, e.g. for aircraft, comprising preparing a panel preform having a pair of surface members or skins (29, 30) separated and supported by an internal core (26–28) in which spaces or interconnected pores provide vents to an edge of the panel, the wall surface members and the core comprising fibrous material, which may be carbon fibre, and using a pyrolysis process such as CVD to form a pyrolyric matrix around the fibres within the fibrous material, there being a flow of gas through the vents during the pyrolysis process.

5 Claims, 2 Drawing Sheets 5,547,737

LIGHT-WEIGHT, HIGH-STRENGTH, STIFF PANELS

This is a divisional of application Ser. No. 08/, 190,615 filed on Feb. 2, 1994 now U.S. Pat. No. 5,360,500, which is an FWC of Ser. No. 08/074,985 filed on Jun. 10, 1993, abandoned which is an FWC of Ser. No. 07/888,403 filed on May 21, 1992, abandoned which is an FWC of Ser. No. 07/725,225 filed on Jun. 26, 1991, abandoned which is an FWC of Ser. No. 07/390,459 filed on Aug. 4, 1989, abandoned which is an FWC of Ser. No. 07/121,119 filed on Nov. 20, 1987, abandoned.

BACKGROUND OF THE INVENTION

FIELD OF THE INVENTION

This invention relates to panels, and particularly but not exclusively to the construction of light-weight panels for use, for example, in aircraft construction.

For the purpose of this Description the word "panel" is to be understood to mean any wall element which presents a surface area bounded by at least one edge and which may be flat or may be of curved cross-section in one or more planes, such as a portion of a cylinder, a cone, or a sphere.

RELATED ART

In order to construct a panel having a high stiffness to weight ratio it is known to make such panels from two thin skins of suitable material, separated by a light-weight internal core such as a honeycomb structure. The core may be of different material from the skins.

SUMMARY OF THE INVENTION

The present invention is concerned primarily with the problem of providing a light-weight panel having a high stiffness and high strength at elevated temperatures, particularly but not exclusively for aerospace applications.

According to the invention a method for the manufacture of a panel comprises preparing a panel preform having a pair of wall surface members separated and supported by a core structure in which spaces or interconnected pores provide vents to an edge of the panel, the wall surface members and the core comprising fibrous material, and using a pyrolysis process to form a pyrolytic matrix around the fibres within the fibrous material, there being a flow of gas through the vents during the pyrolysis process.

A preferred method in accordance with the invention for the manufacture of a carbon-carbon composite panel comprises forming a core structure as a series of hollow members of carbon fibre defining spaces providing vents to an edge of the panel, securing a pair of carbon fibre wall surface members one to each side of the core, and using a pyrolysis process to form a pyrolytic carbon matrix around the carbon fibres, there being a flow of gas through the vents during the pyrolysis process.

The invention also provides a panel constructed by either of the methods defined in the preceding two paragraphs.

In this Description and the Claims, the term 'pyrolytic matrix' means and is limited to a matrix which has been produced by the action of heat at a temperature above 400 degrees Celsius to bring about chemical decomposition of a matrix precursor material as in, for example, the conversion of a carbon compound to carbon with the liberation of gaseous by-products, or chemical decomposition of carbon into the interstices within a preform as in, for example, the introduction of a carbonaceous gas and cracking the gas to deposit carbon (with the production of gaseous by-products). In the high-temperature 'decomposition' and 'deposition' processes as understood in this context it is important to provide vent means to permit gases to penetrate and/or escape from the panel, and the use of the terms 'pyrolysis' and 'pyrolytic matrix' is intended to exclude matrices made by other chemical processes in which there is no requirement for the entry or venting of gases.

The wall surface members and the core structure may comprise a preform of carbon fibre rigidified by a carbon matrix deposited by chemical vapour deposition (CVD) to form a carboncarbon composite or by a pitch- or resin-char process, all of these methods being well known. Preferably the fibrous material is bonded and rigidified by the resin-char and/or CVD processes. The carbon fibre may be un-graphitised, partially graphitised or fully graphitised depending on the thermal conductivity properties required. It may be pre-carbonised or carbonised in situ, for example from a fabric made from oxidised acrylic (i.e. polyacrylonitrile) fibre (by the use of the term "pre-carbonised" it is to be understood that the carbon fibres have been fully carbonised before incorporation into the wall surface members or core structure).

Alternatively, the core structure may comprise rigidified felts or open-cellular foam materials.

Other fibrous materials such as fibres of silicon carbide or mixtures of carbon fibres and silicon carbide fibres could be employed. For oxidation resistance at high temperatures other ceramic or glass-ceramic fibres may be used. The matrix may contain or comprise other materials such as anti-oxidant or other additives, or, for example, a silicon carbide matrix may be employed.

Conversion processes may be used to transform a fabric preform into other forms; for example, a carbon preform may be converted to silicon carbide by a suitable thermochemical process.

BRIEF DESCRIPTION OF THE DRAWINGS

Embodiments of the invention will now be described, with reference to the accompanying drawings, in which.

DETAILED DESCRIPTION OF THE PREFERRED EMBODIMENTS

Figure 1:
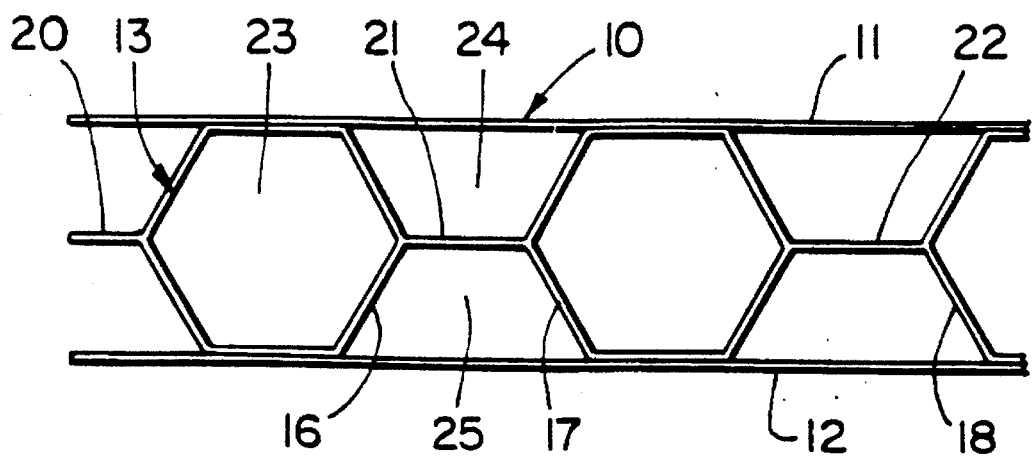
FIG. 1 is a diagrammatic cross-sectional view showing part of a panel made by a method in accordance with the invention.

The panel 10 shown in FIG. 1 comprises two outer wall surface members or skins 11 and 12 bonded to, and separated by, a core structure 13.

The core structure 13 consists of a series of linked hexagonal tubes 16, 17 and 18 formed from knitted oxidised acrylic fibre to provide a unitary structure in which the tubes are linked by webs 20, 21, 22 of the knitted fabric.

In manufacture, the tubes 16, 17, and 18 are formed to hexagonal shape by the insertion of suitably shaped formers (e.g. of carbon) and are subjected to a carbonising process. The formers are then replaced by fugitive supports. The outer skins 11 and 12 which are of carbon fibre fabric are then lightly bonded by the use of suitable resin adhesive to the outer surfaces of the tubes as shown in FIG. 1. The assembly is held flat between carbon plates during the curing and carbonising of the resin and the resulting free-standing panel is then subjected to chemical vapour deposition of carbon to densify both the core 13 and the skins 11 and 12.

By employing hollow members in the form of the tubes 16, 17, 18, which extend parallel to the plane of the panel 10, the panel structure is well-adapted for the penetration of chemical vapour through spaces 23, 24, 25, extending parallel to the plane of the panel to all parts of the structure and venting to the edges of the panel, providing uniform deposition of the necessary densifying carbon matrix.

As an alternative, the core and/or the skins may be pre-impregnated with a suitable resin which is subsequently carbonised, and again the open structure of the core provides spaces through which the non-carbon constituents of the resin can escape in gaseous form.

Figure 2:
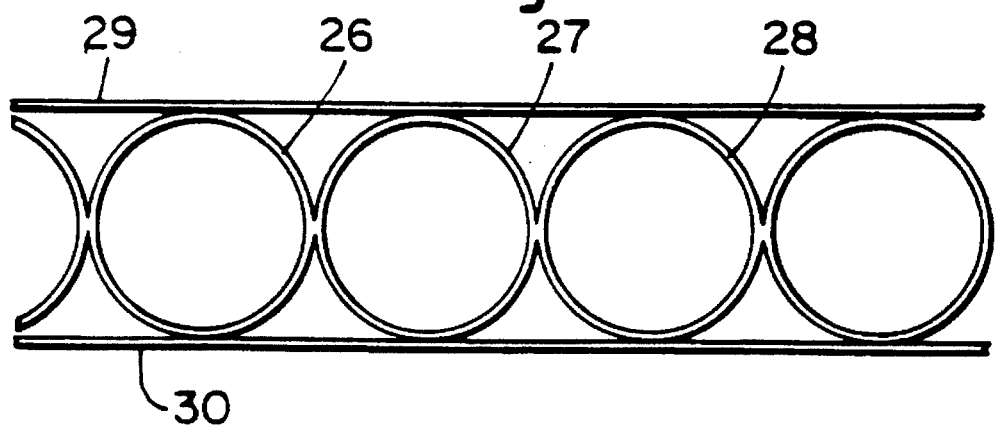
FIGS. 2, 3, 4 and 5 are similar views to FIG. 1 showing alternative panel constructions made by methods in accordance with the invention.

The construction shown in FIG. 2 is similar in all respects to that of FIG. 1 except that the tubes 26, 27, 28, are knitted together in side-by-side integrally secured relationship without linking webs and are held in circular cross-sectional shape between outer skins 29, 30.

Figure 3:
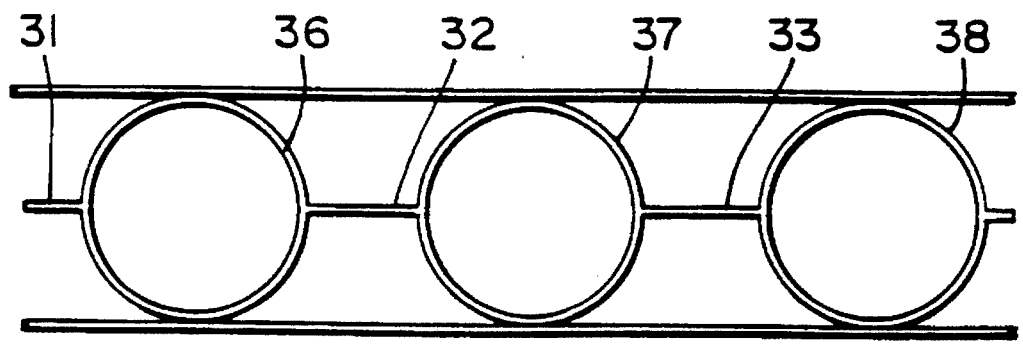

The construction of FIG. 3 includes circular cross-sectional tubes 36, 37, 38; which again are knitted integrally with webs 31, 32, 33.

Any desired spacing or tube cross-sectional shape can be achieved by modifying the knitting process and providing suitable formers.

Figure 4:
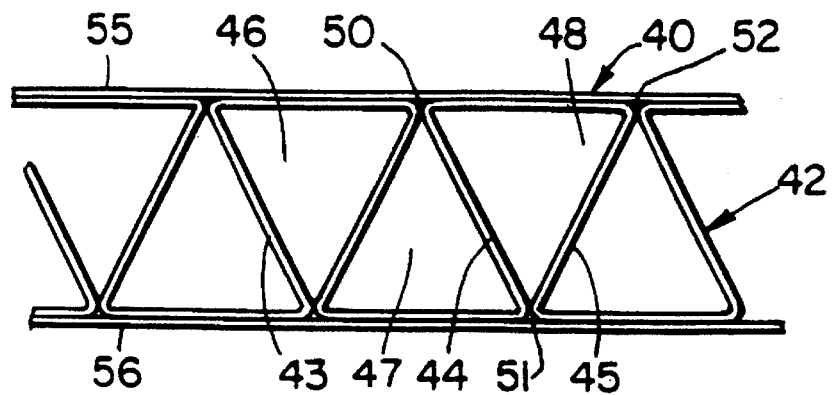

FIG. 4 shows a panel 40 constructed similarly to those described above, except that the core 42 is provided by triangular tubes 43, 44, 45, enclosing spaces 46, 47, 48, which vent to the edges of the panel. The fabric forming the core 42 may be knitted as an integral structure with linking stitches at the edges 50, 51, 52, of adjoining tubes, or may be made from woven, unwoven or knitted fabric folded around suitable formers in the configuration shown.

One advantage of the core structure shown in FIG. 4 lies in the large bonding area presented by the sides of the triangular tubes 43, 44, 45, in contact with the respective skins 55, 56.

Figure 5:
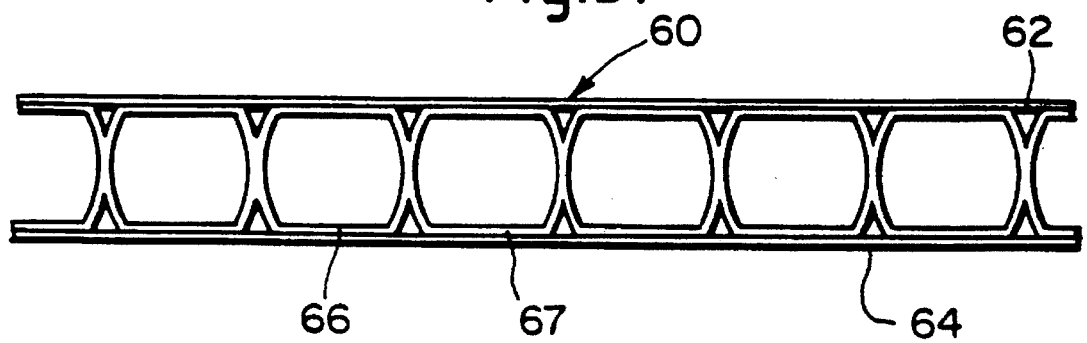

FIG. 5 shows part of a panel 60 comprising outer skins 62, 64, incorporating tubes 66, 67, the construction being generally similar to that of FIG. 2 but in this case the tubes 66, 67 being of flattened cross-section to increase the bonding area between the tubes and the skins.

The manufacture of panels in accordance with the invention will now be more specifically described in the following Examples:

EXAMPLE 1

To manufacture a panel as illustrated in FIG. 5, oxidised acrylic fibre was formed into integrally knitted tubes 66, 67, 68, each tube having a nominal diameter of 10 millimeters, a pitch of approximately 12 millimeters and a nominal wall thickness of 1 millimeter.

Graphite rods of 10 millimeter diameter were inserted into the knitted tubes. These provided support during the subsequent carbonising process, ensuring that the knitted tubes retained a circular cross-section.

The carbonising of the acrylic fibres was achieved by heating in nitrogen, driving off compounds of nitrogen, carbon, hydrogen and oxygen, and converting the fibres to carbon. The temperature was raised at a rate of 100 degrees Celsius per hour up to 1020 degrees Celsius (plus or minus 10 degrees Celsius) and held for 4 hours. A positive pressure of nitrogen with a continuous flow was maintained at all times during heating and cooling.

Figure 6:
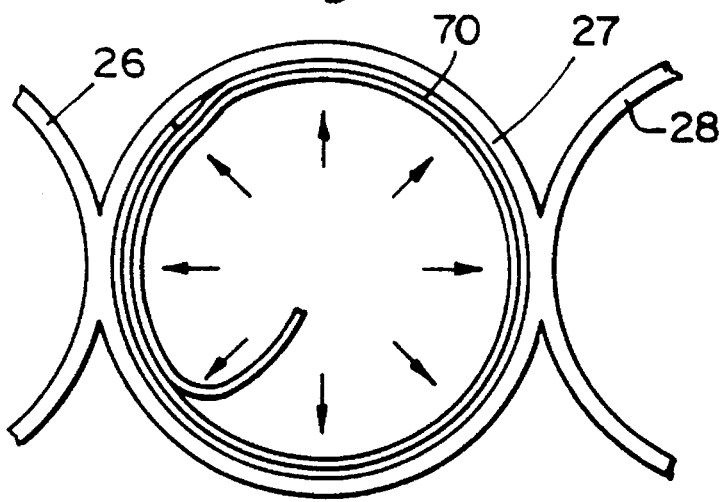
FIG. 6 is a diagrammatic cross-sectional view showing part of a panel in the course of construction.

After carbonising, the graphite rods were removed and scrolled paper tubes 70 were inserted into each of the knitted tubes (see FIG. 6). The tendency of the paper tubes to unscroll applied a light outward pressure as indicated by the arrows in FIG. 6 to support the knitted tubes. The tubes were then painted with resin and bonded to separately formed skins 62, 64 as described below. The paper scrolls provided a support which could easily be removed at a subsequent stage.

The skins 62, 64 were made from a non-woven fabric of aligned oxidised acrylic fibre arranged in two layers with the fibres of the respective layers mutually perpendicular, and lightly needled together. The fabric was carbonised in a similar process to that used for the knitted tubes.

The tubes and skins were then (separately) evenly painted with a 50% (approximate) by volume mix of phenolic resin (Cello Bond J22255, supplied by BP Chemicals) and acetone, giving a distribution of resin of around 0.05 grammes per square centimeter over the entire surface of each component.

The skins were then placed one on each side of the knitted tubes, as shown in FIG. 2, with the fibres on the external surfaces parallel to the axes of the tubes. The panel assembly thus formed, comprising wall surface members and core, was then pressed to a total thickness of 10 millimeters (set by suitable spacers) between flat graphite plates, with a layer of silicone-treated paper on each side to prevent the resin bonding to the plates. A pressure of 7000 Newtons per square meter as then applied to the panel by stacking weights on top of the plates. The paper tubes allowed the knitted tubes to deform to the shape shown in FIG. 5.

After allowing to dry overnight, the resin in the panel as heated to cure the resin whilst maintaining a 10 millimeter spacing between the graphite plates. The temperature was first held at 80 degrees Celsius for one hour and was then raised at a rate of 6 degrees Celsius per hour with holding periods of 2 hours at 120 degrees Celsius, 3 hours at 150 degrees Celsius, 3 hours at 175 degrees Celsius and 4 hours at 210 degrees Celsius.

Following curing of the resin, the spacers were removed and a light pressure of approximately 15 Newtons per square meter was applied by the flat graphite plates to prevent distortion during carbonisation.

The resin was then carbonised by heating in nitrogen. The temperature was raised at a rate of 20 degrees Celsius per hour up to 750 degrees Celsius and 50 degrees Celsius per hour up to 1050 degrees Celsius, and held at 1050 degrees Celsius for 4 hours. A positive pressure of nitrogen with a continuous flow was maintained at all times during heating and cooling.

Following the carbonisation stage the panel was freestanding. The charred paper tubes and silicone-treated paper were removed.

The panel was then held by its edges in a jig and subjected to a 500-hour infiltration process at a high temperature in a vacuum furnace supplied with methane at low pressure, the methane being cracked to deposit carbon in the matrix between the fibres of the panel by the CVD process. The amount of the carbon deposited was in the order of 0.4 grammes per square centimeter of the panel area (i.e. the area of one large face of the panel).

The final panel had the following constituent parts and characteristics :

|  | % by Weight |
| --- | --- |
| Knitted carbon fibre tubes | 21 |
| Carbon fibre skins | 12 |
| Charred resin carbon matrix | 11 |
| CVD carbon matrix | 56 |

Average wall density=1.18 grammes per cubic centimeter

Overall bulk density=0.62 grammes per cubic centimeter

Overall thickness=10 millimeters

Weight per unit area=0.62 grammes per square centimeter

Thickness of each skin=1 millimeter

EXAMPLE 2

A knitted oxidised acrylic fibre structure generally similar to that of Example 1 was assembled and carbonised by the method of Example 1. In this Example the skins were formed from an 8-harness satin weave fabric (A0021, supplied by Fothergill Engineering Fabrics, using 1000-filament tows of acrylic-based carbon fibre made by Toray (T300).

Each skin comprised a single layer of resin-painted fabric and the skins were assembled one on each side of the knitted tubes with the skin fibres orientated at 0 degrees and 90 degrees to the axes of the tubes.

The carbonising and CVD processes were then carried out in the same way as described in Example 1.

The finished panel had the following constitutent parts and characteristics :

|  | % by Weight |
| --- | --- |
| Knitted carbon fibre tubes | 37 |
| Carbon fibre skins | 5 |
| Charred resin carbon matrix | 13 |
| CVD carbon matrix | 45 |

Average wall density=1.1 grammes per cubic centimeter

Overall bulk density=0.71 grammes per cubic centimeter

Overall thickness=9 millimeters

Weight per unit area=0.64 grammes per square centimeter

Thickness of each skin=0.25 millimeters

EXAMPLE 3

An assembly of oxidised-acrylic integrally-knitted fibre tubes and non-woven fabric skins was prepared as described in Example 1, but in this Example the assembly was carbonised in a single process, avoiding entirely the use of resin or any other bonding agent. 10-millimeter-diameter graphite rods were inserted into the knitted tubes, and the fabric skins were laid up with the fibres on the external surfaces parallel with the axes of the tubes. The assembly was held together during carbonisation between two flat graphite plates under a constant pressure of approximately 7000 Newtons per square meter. The carbonisation cycle was similar to that of the skin and core fibres in Example 1. The constant applied pressure, together with the tendency of the fibres to shrink and curl during carbonising, caused the skins and tubular core to "lock" together.

After carbonising, the 10 millimeter rods and flat plates were carefully removed. The resultant fibre panel retained the shape imposed upon it by the plates and rods (as shown in FIG. 2) and was free-standing and handleable. It was then supported by its edges within a graphite jig in such a way as to allow the passage of gas around it and along the hollow tubes of the core during a subsequent CVD infiltration process as described in Example 1. The amount of carbon deposited by the CVD process was approximately 0.6 grammes per square centimeter.

The finished panel had the following constituent parts and characteristics :

|  | % by Weight |
| --- | --- |
| Knitted carbon fibre tubes | 18 |
| Carbon fibre skins | 10 |
| CVD carbon matrix | 72 |

Average wall density=1.4 grammes per cubic centimeter

Overall bulk density=0.72 grammes per cubic centimeter

Overall thickness=11.5 millimeters

Weight per unit area=0.83 grammes per square centimeter

Thickness of each skin=1 millimeter

EXAMPLE 4

A panel was manufactured in an identical process to that described in Example 3 except that non-circular graphite rods were employed to support the tubes in the initial carbonisation process, providing a structure following carbonisation of a noncircular cross-section as shown in FIG. 5 which was then subjected to a CVD process as described in Example 3.

The use of rigid, shaped, graphite rods for internal support in the method of Example 4 provided a larger contact area between the knitted tube core and the skins, providing improved bonding between the core and the skins by the initial carbonisation process.

The finished panel had the following constituent parts and characteristics :

|  | % by Weight |
| --- | --- |
| Knitted Carbon fibre tubes | 15 |
| Carbon fibre skins | 15 |
| CVD carbon matrix | 70 |

Average wall density=1.4 grammes per cubic centimeter

Overall bulk density=0.51 grammes per cubic centimeter

Overall thickness=12 millimeters

Weight per unit area=0.55 grammes per square centimeter

Thickness of each skin=1 millimeter

Panels formed in the manner of the examples described above have the advantages of low density and high stiffness. A major feature is the provision of spaces extending throughout the core to allow penetration of gases in a chemical vapour deposition process or the escape of gases in a resin char process for densification. The panel can readily be formed, by the use of suitable jigs in the carbonising and densification processes, to required curved shapes.

Certain kinds of panel in accordance with the invention, particularly panels made up from ungraphitised carbon-carbon composite may also be suitable for use at very low temperatures since they combine mechanical strength with a low thermal conductivity perpendicular to the panel (resulting from the hollow spaces in the core structure).

Whilst in the examples described above two wall surface members separated by a core structure are employed, the core may include one or more strengthening members, for example a multiple-layer sandwich construction may comprise at least two superimposed hollow core structures with an intermediate skin.

We claim:

1. A panel comprising a pair of wall surface members separated and supported by a core structure comprising spaces or interconnected pores venting to an edge of the panel, the wall surface members and the core being of fibrous material rigidified by a pyrolytic matrix.

2. A panel comprising a pair of wall surface members bonded one to each side of a core structure, the core structure comprising a series of hollow members defining spaces venting to an edge of the panel, the hollow members and the wall surface members being of carbon fibre rigidified by a pyrolytic carbon matrix.

3. A lightweight fiber-reinforced panel having a thickness of at least 5 millimeters, a bulk density of less than 1 gram/cubic centimeter, said panel having a pair of wall surface members separated and supported by a core structure, in which spaces or interconnected pores provide vents to an edge of the panel, comprising at least one of a rigidified felt material, an open-cellular foam material and a series of hollow members comprising fibrous material, said wall surface members and said core being rigidified by a pyrolyric matrix and said panel being suitable for use at elevated temperatures of at least 400 degrees Celsius.

4. A lightweight fiber-reinforced panel having a thickness of at least 5 millimeters, a bulk density of less than 1 gram/cubic centimeter, said panel having a pair of wall surface members separated and supported by a core structure, in which spaces or interconnected pores provide vents to an edge of the panel, comprising at least one of a rigidified felt material, an open-cellular form material and a series of hollow members comprising fibrous material, said wall surface members and said core being rigidified by a pyrolyric matrix of a type deposited in a chemical vapour deposition process and said panel being suitable for use at elevated temperatures of at least 400 degrees Celsius.

5. A lightweight carbon fiber-reinforced panel having a thickness of at least 5 millimeters, a bulk density of less than 1 gram/cubic centimeter, said panel having a pair of wall surface members separated and supported by a core structure, in which spaces or interconnected pores provide vents to an edge of the panel, comprising at least one of a rigidified felt material, an open-cellular foam material and a series of hollow members of carbon fiber, said wall surface members and said core being rigidified by a pyrolyric carbon matrix of a type deposited in the chemical vapour deposition process and said panel being suitable for use at elevated temperatures of at least 400 degrees Celsius.

* * * * *